(12) United States Patent
Zheng

(10) Patent No.: US 8,342,706 B2
(45) Date of Patent: Jan. 1, 2013

(54) LED LAMP

(75) Inventor: Shi-Song Zheng, Shenzhen (CN)

(73) Assignees: Fu Zhun Precision Industry (Shen Zhen) Co., Ltd., Shenzhen (CN); Foxconn Technology Co., Ltd., New Taipei (TW)

( * ) Notice: Subject to any disclaimer, the term of this patent is extended or adjusted under 35 U.S.C. 154(b) by 230 days.

(21) Appl. No.: 12/862,772

(22) Filed: Aug. 25, 2010

(65) Prior Publication Data

US 2011/0128728 A1 Jun. 2, 2011

(30) Foreign Application Priority Data

Dec. 1, 2009 (CN) .............................. 200910310741

(51) Int. Cl.
*F21L 4/02* (2006.01)
(52) U.S. Cl. ..................... 362/184; 362/249.02; 362/431
(58) Field of Classification Search .................. 362/431, 362/184, 249.02
See application file for complete search history.

(56) References Cited

U.S. PATENT DOCUMENTS

| 7,976,180 B1* | 7/2011 | Haun et al. ..................... 362/183 |
| 2007/0247859 A1* | 10/2007 | Haddad et al. ................. 362/431 |
| 2009/0231838 A1* | 9/2009 | Kim .............................. 362/158 |
| 2009/0290343 A1* | 11/2009 | Brown et al. .................. 362/235 |

\* cited by examiner

*Primary Examiner* — Evan Dzierzynski
(74) *Attorney, Agent, or Firm* — Altis Law Group, Inc.

(57) ABSTRACT

An exemplary LED lamp includes a central member, lamp bodies, a solar panel transforming solar power to electric energy, and a supporting member supporting the solar panel over the central member. Each lamp body includes a housing and an LED module received in the housing. The housings of the lamp bodies have bottoms thereof mounted around the central member and have tops thereof extending upwardly and outwardly from the central member. Each of the housings defines an opening facing away from the central member. Light generated by the LED modules projects out of the lamp bodies through the openings. The solar panel provides the electric energy to the LED modules.

12 Claims, 4 Drawing Sheets

LED LAMP

BACKGROUND

1. Technical Field

The disclosure generally relates to an LED lamp.

2. Description of Related Art

An LED lamp is a type of solid-state lighting that utilizes light-emitting diodes (LEDs) as a source of illumination. The LED lamp is intended to be a cost-effective yet high quality replacement for incandescent and fluorescent lamp because the LED has features of long-term reliability, environment friendliness and low power consumption.

A typical LED lamp includes a number of LEDs, and most of the LEDs are driven at the same time, which results in a quick rise in temperature of the LED lamp. Generally, the LED lamp further includes a heat sink dissipating heat generated by the LEDs. All of the LEDs are attached to a planar surface of the heat sink. When the LED lamp works, the LEDs attached to the planar surface of the heat sink only form a flat light source, not a three-dimensional light source. In addition, the LED lamp is generally mounted on a lamp pole and extends towards a side of the lamp pole to only illuminate a region at the side of the lamp pole. Thus, the LED lamp fails to provide a three-dimensional lamplight that is suitable for a condition that needs even and large-scale light.

What is needed, therefore, is an LED lamp which can overcome the above-mentioned limitations.

BRIEF DESCRIPTION OF THE DRAWINGS

Many aspects of the present illuminating device can be better understood with reference to the following drawings. The components in the drawings are not necessarily drawn to scale, the emphasis instead being placed upon clearly illustrating the principles of the present illuminating device. Moreover, in the drawings, like reference numerals designate corresponding parts throughout the several views.

DETAILED DESCRIPTION

Figure 1:
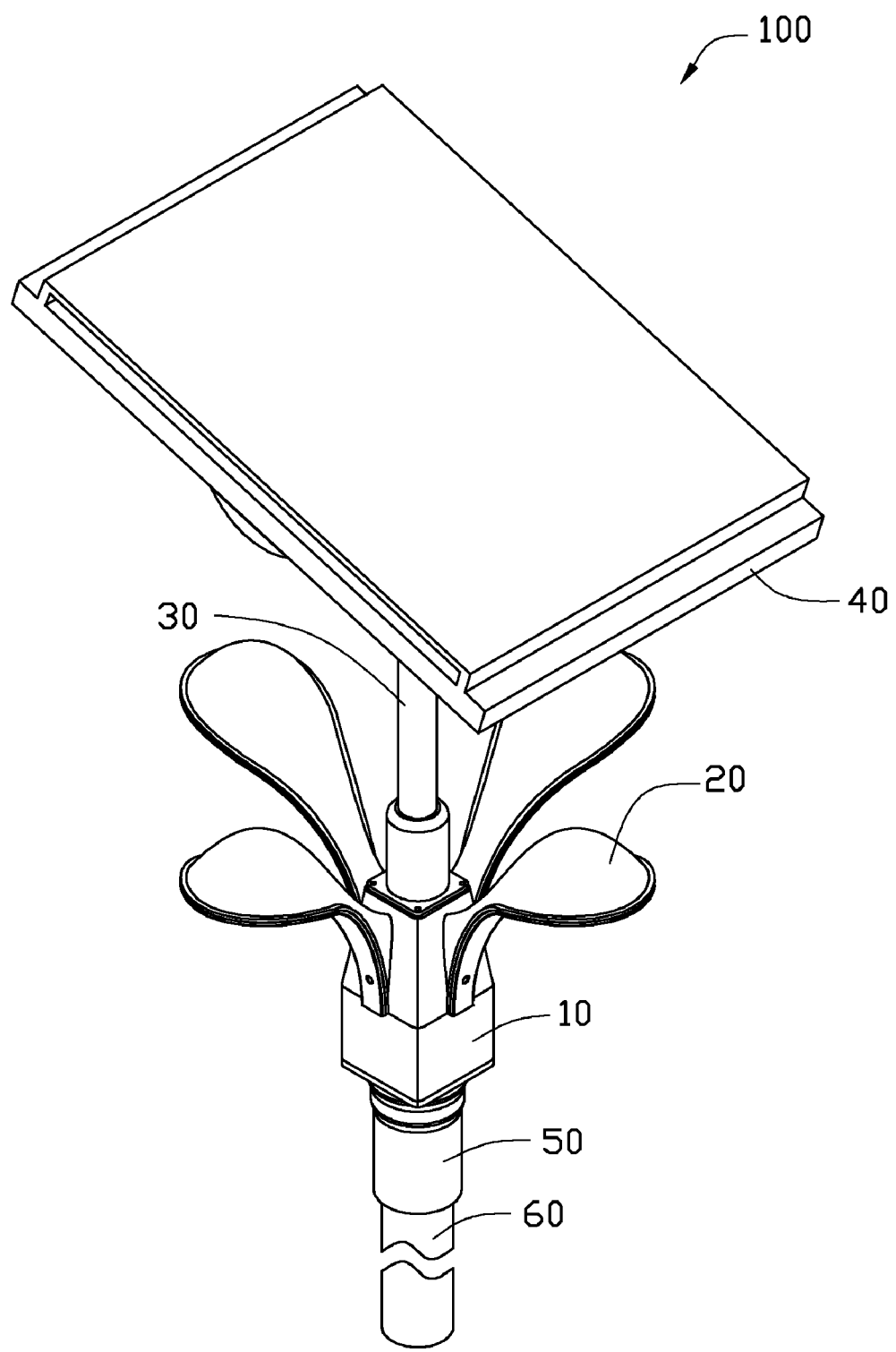
FIG. 1 is an isometric, assembled view of an LED lamp in accordance with a first embodiment of the disclosure, wherein the LED lamp is mounted on a lamp pole.
Figure 2:
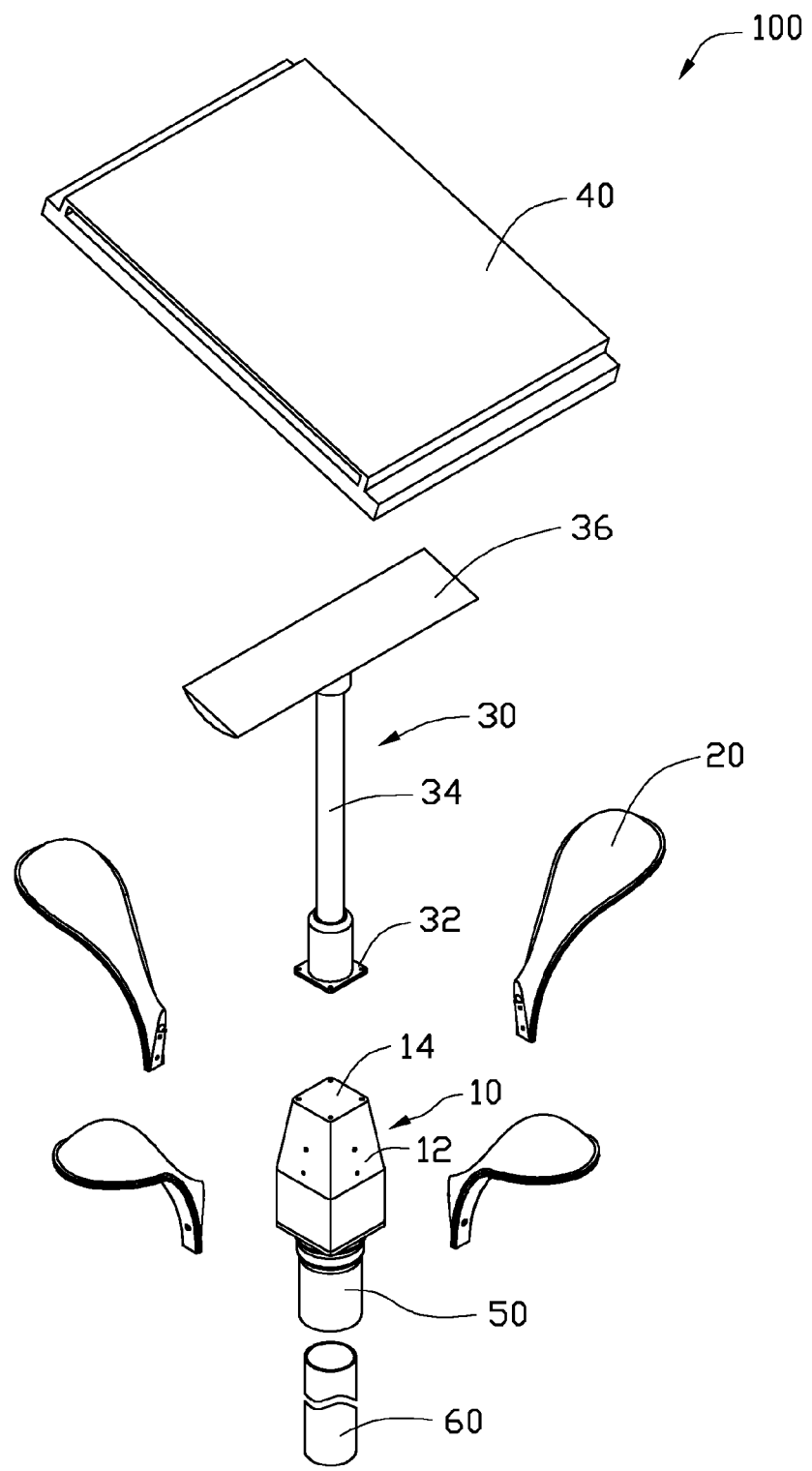
FIG. 2 is an isometric, exploded view of the LED lamp and the lamp pole of FIG. 1.

Referring to FIGS. 1-2, an LED lamp 100 in accordance with a first embodiment is illustrated. The LED lamp 100 comprises a central member 10, four lamp bodies 20 evenly attached to a circumference of the central member 10, a supporting member 30 extending upwardly from a top of the central member 10, a solar panel 40 supported by the supporting member 30, and a sleeve 50 connected with a bottom portion of the central member 10. The LED lamp 100 can be held at a predetermined position by a lamp pole 60.

The central member 10 is a hollow and prism-shaped box to receive related electronic components (not shown) including a storage battery, a charger and a controller therein. The central member 10 has a top end portion thereof tapering along a bottom-to-top direction to define a plurality of slantwise mounting surfaces 12 on a circumferential periphery thereof. Number of the mounting surfaces 12 is identical to that of the lamp bodies 20. In this embodiment, the amount of the mounting surfaces 12 is four, and the amount of the lamp bodies 20 is also four.

Figure 3:
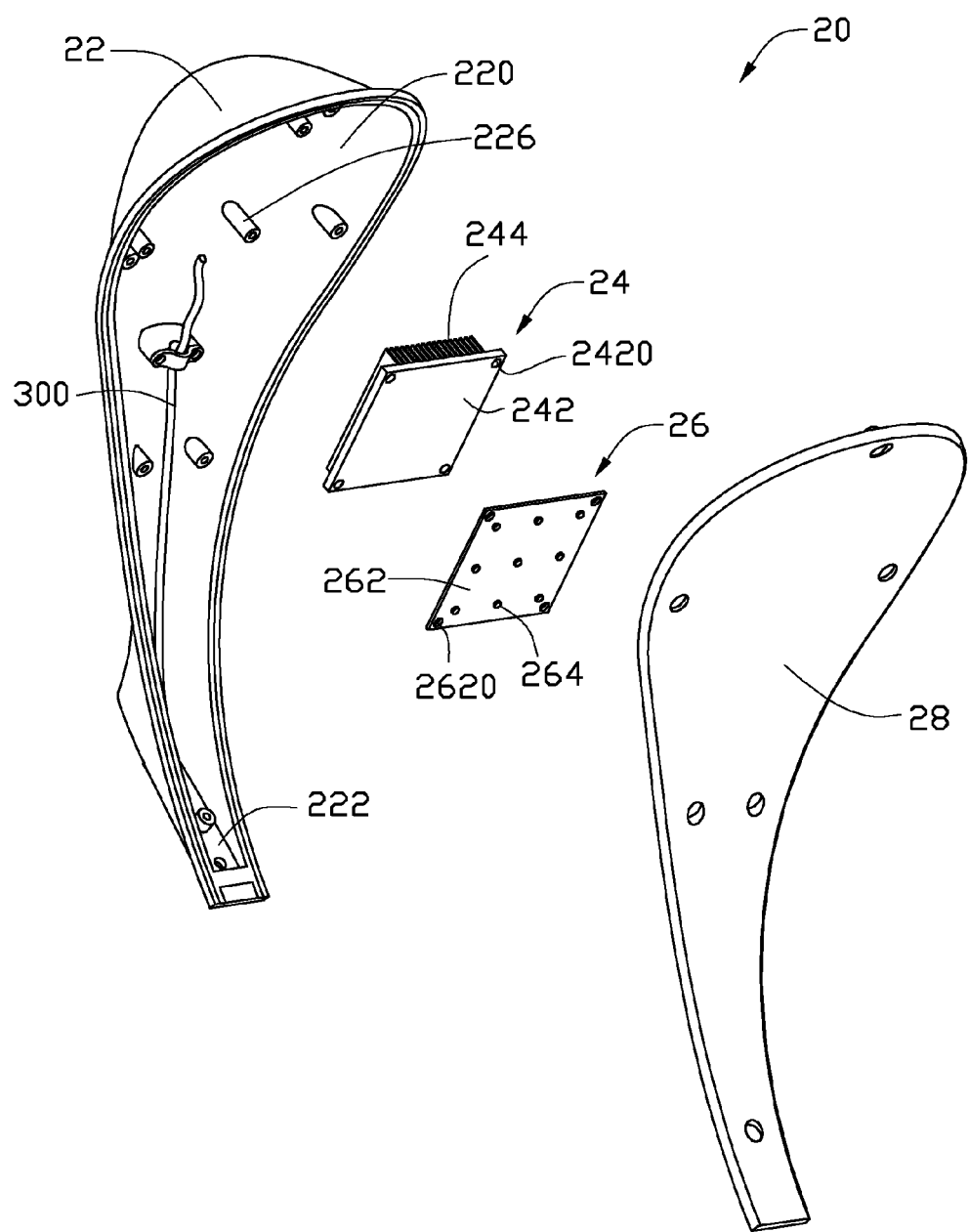
FIG. 3 is an isometric, exploded view of a lamp body of the LED lamp of FIG. 2.

Referring also to FIG. 3, the lamp bodies 20 are attached to the mounting surfaces 12 of the central member 10 and extend upwardly and radially from corresponding mounting surfaces 12. Each of the lamp bodies 20 comprises a housing 22, a heat sink 24 secured to the housing 22, an LED module 26 attached to the heat sink 24, and an envelope 28 engaged with the housing 22 to cooperatively receive the heat sink 24 and the LED module 26 therein. The LED module 26 faces the envelope 28. Light generated by the LED module 26 radiates out though the envelope 28. The envelope 28 is made of transparent/translucent glass or plastic.

The housing 22 gradually expands from bottom to top to form a spoon-shaped configuration. The housing 22 defines an opening 220 facing away from the central member 10. A top of the housing 22 defines a receiving space (not labeled) to receive the heat sink 24 and the LED module 26 therein. A bottom of the housing 22 forms a mounting plate 222. The housing 22 forms a plurality of parallel and spaced securing posts 226 at an inner wall of the top thereof. The mounting plates 222 are secured to the mounting surfaces 12 of the central member 10.

The heat sink 24 comprises a base 242 and a plurality of fins 244 extending perpendicularly from the base 242 towards the inner wall of the top of the housing 22. The base 242 is rectangular. A hole 2420 is defined in each corner of the base 242. The holes 2420 correspond to the securing posts 226 of the housing 22. The fins 244 are parallel to and spaced from each other.

The LED module 26 comprises a printed circuit board 262 and a plurality of LEDs 264 attached to the printed circuit board 262. The printed circuit board 262 is rectangular. A size of the printed circuit board 262 is substantially identical to that of the base 242 of the heat sink 24. A through hole 2620 is defined in each corner of the printed circuit board 262, corresponding to one of the holes 2420.

The envelope 28 is integrally formed of transparent or semitransparent materials such as glass or plastic. The envelope 28 expands upwards from bottom to top to fitly cover the opening 220 of the housing 22.

In assembly of each lamp body 20, the corners of the heat sink 24 abut the securing posts 226 of the housing 22, and the fins 244 are located between the base 242 of the heat sink 24 and the inner wall of the top of the housing 22. The LED module 26 is attached to an outer surface of the base 242. The holes 2420 in the base 242 align with the through holes 2620 in the printed circuit board 262. Screws (not shown) extend sequentially through the through holes 2620 and the holes 2420, and engage into the securing posts 226, whereby the heat sink 24 and the LED module 26 are secured to the housing 22. The LED module 26 is electrically connected with the storage battery received in the central member 10 via a wire 300.

The supporting member 30 is secured to a top surface 14 of the central member 10, and extends upwardly from the top surface 14 of the central member 10 to support the solar panel 40 over the central member 10. The supporting member 30 comprises a bottom base 32, a shaft 34 extending perpendicularly and upwardly from the bottom base 32, and a supporting board 36 engaged with a top of the shaft 34. The top of the shaft 34 connects with a middle portion of the supporting board 36. The bottom base 32 has a rectangular configuration. A size of the bottom base 32 is substantially identical to that of the top surface 14 of the central member 10. The supporting board 36 is slantwise with respect to the shaft 34 whereby the solar panel 40 conformably secured on the supporting board 36 is also slantwise with respect to the shaft 34; thus, the solar panel 40 is able to collect more solar energy.

The sleeve 50 has a top thereof secured on a bottom of the central member 10. The sleeve 50 has a bottom portion thereof fittingly receiving a top of the lamp pole 60 therein, whereby the LED lamp 100 is securely mounted on the lamp pole 60.

The lamp bodies 20 have bottom portions thereof mounted to the mounting surfaces 12 of the central member 10, to make the lamp bodies 20 be located around the central member 10. The lamp bodies 20 have top portions thereof facing different directions which are perpendicular to each other around a circumferential periphery of the central member 10; thus, the light generated by the LED modules 26 of the lamp bodies 20 illuminates a region around the lamp pole 60 to form a round light field around the lamp pole 60.

In use of the LED lamp 100, the solar panel 40 collects and stores solar power and transforms the solar power to electric energy. The electric energy is stored in the storage battery in daytime. At night, the storage battery supplies electric energy for the LED modules 26. Thus, the LED lamp 100 can work without an external power supply. In addition, the solar panel 40 shades the lamp bodies 20 from the sun, thereby preventing the lamp bodies 20 from being damaged by the sun. Furthermore, heat generated by the LED modules 26 is absorbed by the bases 242 of the heat sinks 24 and is dissipated by the fins 244, whereby the LED modules 26 are kept in a normal work condition.

Figure 4:
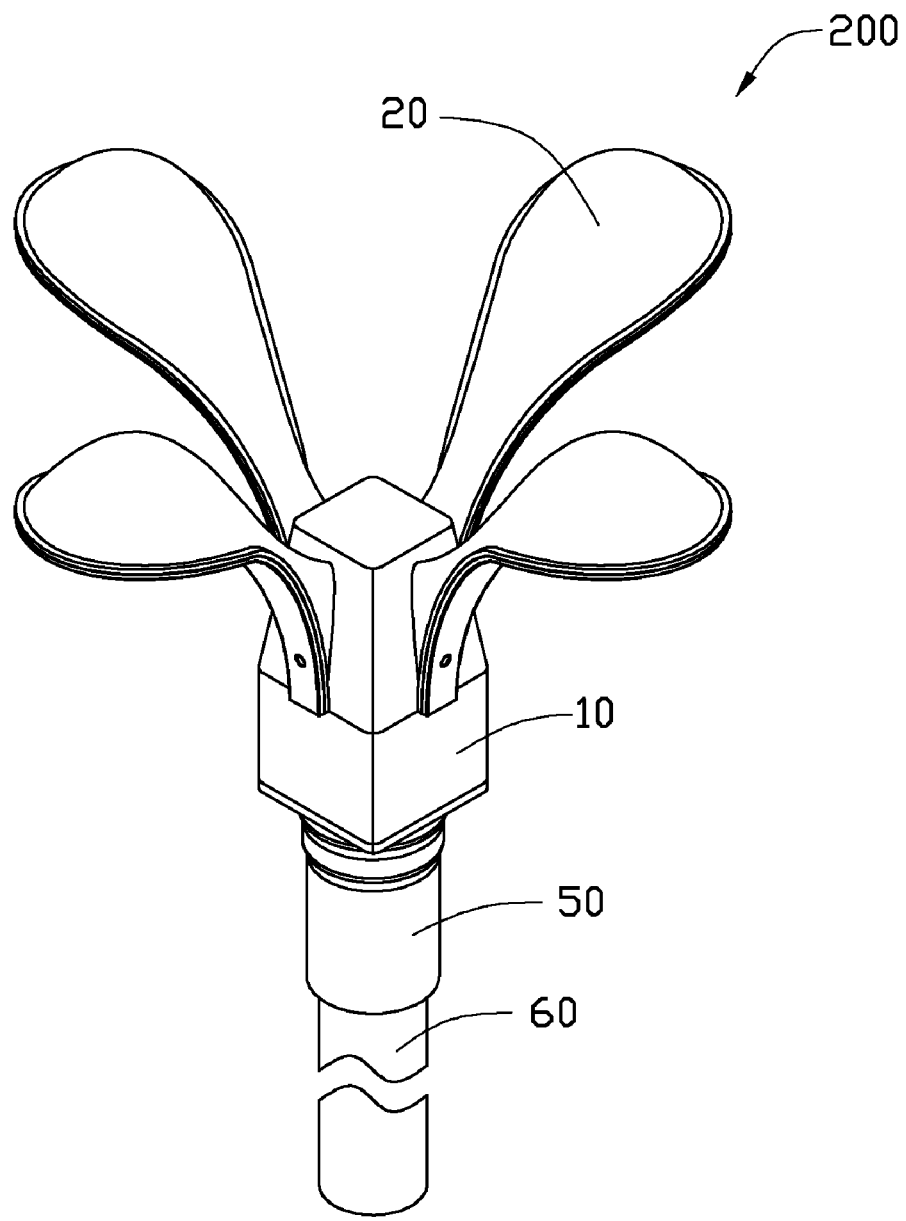
FIG. 4 is an isometric, assembled view of an LED lamp in accordance with a second embodiment of the disclosure and a lamp pole.

Referring also to FIG. 4, an LED lamp 200 in accordance with a second embodiment of the disclosure is shown. The LED lamp 200 is similar to the LED lamp 100 of the first embodiment. Different from the LED lamp 100, the LED lamp 200 omits the supporting member 30 and the solar panel 40. The electric energy needed by the LED lamp 200 is supplied by an external power supply. It is understood that the LED lamp 200 can further omit the lamp pole 60 and make the sleeve 50 be connected with a socket on the ground, thereby functioning as a lawn lamp.

It is believed that the disclosure and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An LED lamp comprising:
a central member having a top end portion thereof tapering along a bottom-to-top direction to define a plurality of slantwise mounting surfaces on a circumferential periphery thereof;
a plurality of lamp bodies each comprising a housing and an LED module received in the housing, the housings of the lamp bodies having bottoms thereof mounted to the mounting surfaces to surround the central member, and having tops thereof extending upwardly and outwardly from the mounting surfaces, the housing of each of the lamp bodies gradually expanding from bottom to top and defining an opening facing away from the central member, light generated by the LED modules projecting out of the lamp bodies through the openings;
a solar panel, wherein the solar panel is located over the central member to provide electric energy for the LED modules;
a supporting member secured to a top surface of the central member, wherein the supporting member comprises a bottom base, a shaft extending upwardly from the bottom base, and a supporting board engaged with a top of the shaft, the solar panel being supported by the supporting board; and
a sleeve, wherein the sleeve has a top end thereof secured to the bottom of the central member, a bottom portion of the sleeve being for fittingly receiving a top end of a lamp pole therein.

2. The LED lamp of claim 1, wherein the housing of each of the lamp bodies has a spoon-shaped configuration.

3. The LED lamp of claim 1, wherein the solar panel shades the lamp bodies to prevent the lamp bodies from being damaged by sunlight.

4. The LED lamp of claim 1, wherein the bottom of the housing of each lamp body forms a mounting plate, the mounting plate being secured to a corresponding one of the mounting surfaces of the central member.

5. The LED lamp of claim 1, wherein each of the lamp bodies further comprises a heat sink received in the housing and an envelope covering the opening, the heat sink comprising a base and a plurality of fins extending from an inner surface of the base, the LED module being attached to an outer surface of the base opposite to the inner surface.

6. The LED lamp of claim 5, wherein the housing forms a plurality of securing posts at an inner wall of the top of the housing, the base of the heat sink having four corners abutting the securing posts, the fins being located between the inner wall of the housing and the base.

7. An LED lamp comprising:
a central member;
a plurality of lamp bodies each comprising a housing and an LED module received in the housing, the housings of the lamp bodies having bottoms thereof mounted around the central member and having tops thereof extending upwardly and outwardly from the central member, each of the housings defining an opening facing away from the central member, light generated by the LED modules projecting out of the lamp bodies through the openings;
a solar panel transforming solar power to electric energy and providing the electric energy to the LED modules;
a supporting member secured to a top surface of the central member for supporting the solar panel over the central member, wherein the supporting member comprises a bottom base, a shaft extending upwardly from the bottom base, and a supporting board engaged with a top of the shaft, the solar panel being supported by the supporting board; and
a sleeve, wherein the sleeve has a top end thereof secured to a bottom of the central member, a bottom portion of the sleeve being for fittingly receiving a top end of a lamp pole therein.

8. The LED lamp of claim 7, wherein the housing of each of the lamp bodies gradually expands from bottom to top to form a spoon-shaped configuration.

9. The LED lamp of claim 7, wherein the solar panel shades the lamp bodies to prevent the lamp bodies from being damaged by sunlight.

10. The LED lamp of claim 7, wherein the central member has a top end portion thereof tapering from bottom to top to define a plurality of slantwise mounting surfaces, the bottoms of the housings being mounted to the mounting surfaces.

11. The LED lamp of claim 7, wherein each lamp body further comprises a heat sink received in the housing and an envelope covering the opening, the heat sink comprising a base and a plurality of fins extending from an inner surface of the base, the LED module being attached to an outer surface of the base opposite to the inner surface.

12. The LED lamp of claim 11, wherein the housing of each of the lamp bodies forms a plurality of securing posts at an inner wall of the top of the housing, the base of the heat sink having four corners abutting the securing posts, the fins being located between the inner wall of the housing and the base.

* * * * *